United States Patent
TeNyenhuis et al.

(10) Patent No.: US 11,075,862 B2
(45) Date of Patent: Jul. 27, 2021

(54) EVALUATING RETRAINING RECOMMENDATIONS FOR AN AUTOMATED CONVERSATIONAL SERVICE

(71) Applicant: INTERNATIONAL BUSINESS MACHINES CORPORATION, Armonk, NY (US)

(72) Inventors: Tristan A. TeNyenhuis, West Islip, NY (US); Isa M. Torres, Poughkeepsie, NY (US); Andrew R. Freed, Cary, NC (US); Barton W. Emanuel, Manasas, VA (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 16/254,158

(22) Filed: Jan. 22, 2019

(65) Prior Publication Data

US 2020/0236068 A1 Jul. 23, 2020

(51) Int. Cl.
*H04L 12/58* (2006.01)
*G06N 20/00* (2019.01)
*G06F 40/40* (2020.01)

(52) U.S. Cl.
CPC ............ *H04L 51/02* (2013.01); *G06N 20/00* (2019.01); *H04L 51/16* (2013.01); *G06F 40/40* (2020.01)

(58) Field of Classification Search
CPC ......... H04L 51/02; H04L 51/16; G06N 20/00; G06F 40/40
USPC ........................................................ 709/206
See application file for complete search history.

(56) References Cited

U.S. PATENT DOCUMENTS

| 7,620,549 B2 | 11/2009 | Di Cristo et al. | |
| 7,983,401 B1 * | 7/2011 | Krinsky | H04M 3/527 |
| | | | 379/88.23 |
| 8,396,741 B2 * | 3/2013 | Kannan | G06Q 30/02 |
| | | | 705/7.42 |

(Continued)

FOREIGN PATENT DOCUMENTS

EP 1232492 B1 12/2003

OTHER PUBLICATIONS

Goldberg, Yoav, "A Primer on Neural Network Models for Natural Language Processing", Oct. 6, 2015, 75 pages, available via the Internet at <http://www.cs.biu.ac.il/˜yogo/nnlp.pdf.>.

(Continued)

*Primary Examiner* — David P Zarka
(74) *Attorney, Agent, or Firm* — David K. Mattheis; Maeve M. Carpenter

(57) ABSTRACT

A retraining service accesses conversational logs, each of the conversational logs recording a separate conversation, between a separate user and a conversational service, and at least one outcome identified with the separate conversation. The retraining service assess, from the conversational logs, at least one conversation gap and response with the at least one outcome matching a type of outcome that indicates the response impacted user experience in a negative way from among types of outcomes. The retraining service evaluates one or more recommendations for retraining the response to promote a positive type of outcome from among the types of outcomes. The retraining service outputs the one or more recommendations to the conversational service for directing retraining of the response by the conversational service.

17 Claims, 7 Drawing Sheets

(56) References Cited

U.S. PATENT DOCUMENTS

| | | | |
|---|---|---|---|
| 9,634,855 B2 | 4/2017 | Poltorak | |
| 9,672,467 B2 | 6/2017 | Gilbert | |
| 9,685,174 B2 | 6/2017 | Karam et al. | |
| 10,019,670 B2 | 7/2018 | Gilbert | |
| 10,424,319 B2* | 9/2019 | Akkiraju | H04M 3/2236 |
| 10,593,350 B2* | 3/2020 | Liu | G10L 25/63 |
| 10,650,097 B2* | 5/2020 | Yin | G06F 40/289 |
| 10,715,668 B1* | 7/2020 | Jayapalan | G06N 5/041 |
| 2007/0100624 A1 | 5/2007 | Weng et al. | |
| 2013/0325992 A1* | 12/2013 | McGann | H04L 51/046 709/206 |
| 2014/0122618 A1 | 5/2014 | Duan | |
| 2015/0032449 A1 | 1/2015 | Sainath et al. | |
| 2015/0066496 A1 | 3/2015 | Deoras et al. | |
| 2015/0095017 A1 | 4/2015 | Mnih et al. | |
| 2015/0269934 A1 | 9/2015 | Biadsy et al. | |
| 2016/0005399 A1 | 1/2016 | Audhkhasi et al. | |
| 2016/0034814 A1 | 2/2016 | Audhkhasi et al. | |
| 2016/0300570 A1 | 10/2016 | Gustafson et al. | |
| 2016/0352656 A1 | 12/2016 | Galley et al. | |
| 2017/0169438 A1* | 6/2017 | Maynard | G06Q 30/016 |
| 2017/0270100 A1 | 9/2017 | Audhkhasi et al. | |
| 2018/0033433 A1 | 2/2018 | Kurata et al. | |
| 2018/0075341 A1 | 3/2018 | Dasgupta et al. | |
| 2018/0082167 A1 | 3/2018 | Kurata et al. | |
| 2020/0234181 A1 | 7/2020 | Katz et al. | |

OTHER PUBLICATIONS

"A Beginner's Guide to Recurrent Networks and LSTMs", 12 pages, accessed via the Internet at <https://deeplearning4j.org/lstm.html> as of Apr. 15, 2018.

Chen et al., "Efficient Sampling and Feature Selection in Whole Sentence Maximum Entropy Language Models", 1999 IEEE International Conference on Acoustics, Speech, and Signal Processing. Proceedings. ICASSP99 (Cat. No. 99CH36258), Phoenix, AZ, 1999, pp. 549-552 vol. 1, 4 pages.

Chen et al., "Recurrent Neural Network Language Model Training with Noise Contrastive Estimation for Speech Recognition", 2015 IEEE International Conference on Acoustics, Speech and Signal Processing (ICASSP), South Brisbane, QLD, 2015, pp. 5411-5415, 5 pages.

Collobert et al., "Natural Language Processing (Almost) from Scratch", Journal of Machine Learning Research, 2011, pp. 2493-2537, 45 pages.

Kim, Yoon, "Convolutional Neural Networks for Sentence Classification", Proceedings of the 2014 Conference on Empirical Methods in Natural Language Processing (EMNLP), pp. 1746-1751, Oct. 25-29, 2014, Doha, Qatar, 6 pages.

Kiros et al., "Skip-Thought Vectors", University of Toronto, Canadian Institute for Advanced Research, submitted on Jun. 22, 2015, available via the Internet at <https://arxiv.org/abs/1506.06726>, 11 pages.

Ma et al., "Dependency-based Convolutional Neural Networks for Sentence Embedding", 6 pages, Aug. 3, 2015, available via the Internet at <https://arxiv.org/abs/1507.01839>.

Wieting et al., "Towards Universal Paraphrastic Sentence Embeddings", ICLR 2016, submitted on Mar. 4, 2016, 19 pages, available via the Internet at <https://arxiv.org/abs/1511.08198>.

Mikolov et al., "Recurrent Neural Network based Language Model", Interspeech 2010, Sep. 26, 2010, Japan, 4 pages.

Mikolov et al., "Conext Dependent Recurrent Neural Network Language Model", Microsoft Research Technical Report, Jul. 27, 2012, 10 pages.

Rosenfeld, R., "A Whole Sentence Maximum Entropy Language Model", 1997 IEEE Workshop on Automatic Speech Recognition and Understanding Proceedings, Santa Barbara, CA, 1997, pp. 230-237, 8 pages.

Anton McConville, "Measuring Emotion with IBM Watson Speech to Text and Tone Analysis", accessed online at <https://www.ibm.com/blogs/bluemix/2016/11/measuring-emotion-ibm-watson-speech-text-tone-analysis/>, Nov. 22, 2016, 12 pages.

Shawar et al, "Using Dialogue Corpora to Train A Chatbot", School of Computing, University of Leeds, Proceedings of the Corpus Linguistics 2003 Conference, 2003, 10 pages.

"Improve-Watson Recommends", accessed online at <https://ibm.box.com/s/msplfe8pgjs48pojl9x5lryrqbdwr0wj>, slide 106, 2017, 1 page.

"List of IBM Patents or Patent Applications Treated as Related", dated Nov. 5, 2020, 2 pages.

"List of IBM Patents or Patent Applications Treated as Related", dated Mar. 19, 2019, 2 pages.

Junghyun Ahn et al. Asymmetric facial expressions: revealing richer emotions for embodied conversational agents. Computer animation & virtual worlds, vol. 24, Issue 6, 2013, pp. 539-551, https://onlinelibrary.wiley.com/doi/pdf/10.1002/cay.1539 ittps:/lpdfs. semanticscholar .orgIcad5118558e66cba8afbd20fd0-514035a02b153f1 .pdf.

Catherine Plachaud et al Embodied Conversational Characters: Representation Formats tor Multimodal communicative Behaviors, In Emotion-Oriented Systems, 2011, pp. 389-415 https:/www.researchgate.net/ mblication/226402988_Embodied_Conversational_Characters_Representation_Formats_for_Multimodal_Communicative Behaviours.

Arjan Egges et al. Generic pesonality and emotion simulation for conversational agents, Computer Animation and Virtual Worlds, vol. 15 Issue 1, Mar. 2004, pp. 1-13 http://iv'tz.lab.sfu.ca/arya/Papers/Others/Model%20for4>/o2OPersonality%20and%20Emotion%20Simulation.pdf.

* cited by examiner

EVALUATING RETRAINING RECOMMENDATIONS FOR AN AUTOMATED CONVERSATIONAL SERVICE

BACKGROUND

1. Technical Field

This invention relates in general to natural language processing and more particularly to evaluating retraining recommendations for an automated conversational service.

2. Description of the Related Art

Many web services incorporate automated conversational services, such as a chat bot, that automate interactions with users using natural language processing.

BRIEF SUMMARY

In one embodiment, a method is directed to accessing, by a computer system, a plurality of conversational logs, each of the plurality of conversational logs recording a separate conversation, between a separate user of a plurality of users and a conversational service, and at least one outcome identified with the separate conversation. The method is directed to assessing, by the computer system, from the plurality of conversational logs, at least one conversation gap and response with the at least one outcome matching a type of outcome that indicates the response impacted user experience in a negative way from among a plurality of types of outcomes. The method is directed to evaluating, by the computer system, one or more recommendations for retraining the response to promote a positive type of outcome from among the plurality of types of outcomes. The method is directed to outputting, by the computer system, the one or more recommendations to the conversational service for directing retraining of the response by the conversational service.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to access a plurality of conversational logs, each of the plurality of conversational logs recording a separate conversation, between a separate user of a plurality of users and a conversational service, and at least one outcome identified with the separate conversation. The stored program instructions comprise program instructions to assess, from the plurality of conversational logs, at least one conversation gap and response with the at least one outcome matching a type of outcome that indicates the response impacted user experience in a negative way from among a plurality of types of outcomes. The stored program instructions comprise program instructions to evaluate one or more recommendations for retraining the response to promote a positive type of outcome from among the plurality of types of outcomes. The stored program instructions comprise program instructions to output the one or more recommendations to the conversational service for directing retraining of the response by the conversational service.

In another embodiment, a computer program product comprises a computer readable storage medium having program instructions embodied therewith, wherein the computer readable storage medium is not a transitory signal per se. The program instructions are executable by a computer to cause the computer to access, by a computer, a plurality of conversational logs, each of the plurality of conversational logs recording a separate conversation, between a separate user of a plurality of users and a conversational service, and at least one outcome identified with the separate conversation. The program instructions are executable by a computer to cause the computer to assess, by the computer, from the plurality of conversational logs, at least one conversation gap and response with the at least one outcome matching a type of outcome that indicates the response impacted user experience in a negative way from among a plurality of types of outcomes. The program instructions are executable by a computer to cause the computer to evaluate, by the computer, one or more recommendations for retraining the response to promote a positive type of outcome from among the plurality of types of outcomes. The program instructions are executable by a computer to cause the computer to output, by the computer, the one or more recommendations to the conversational service for directing retraining of the response by the conversational service.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
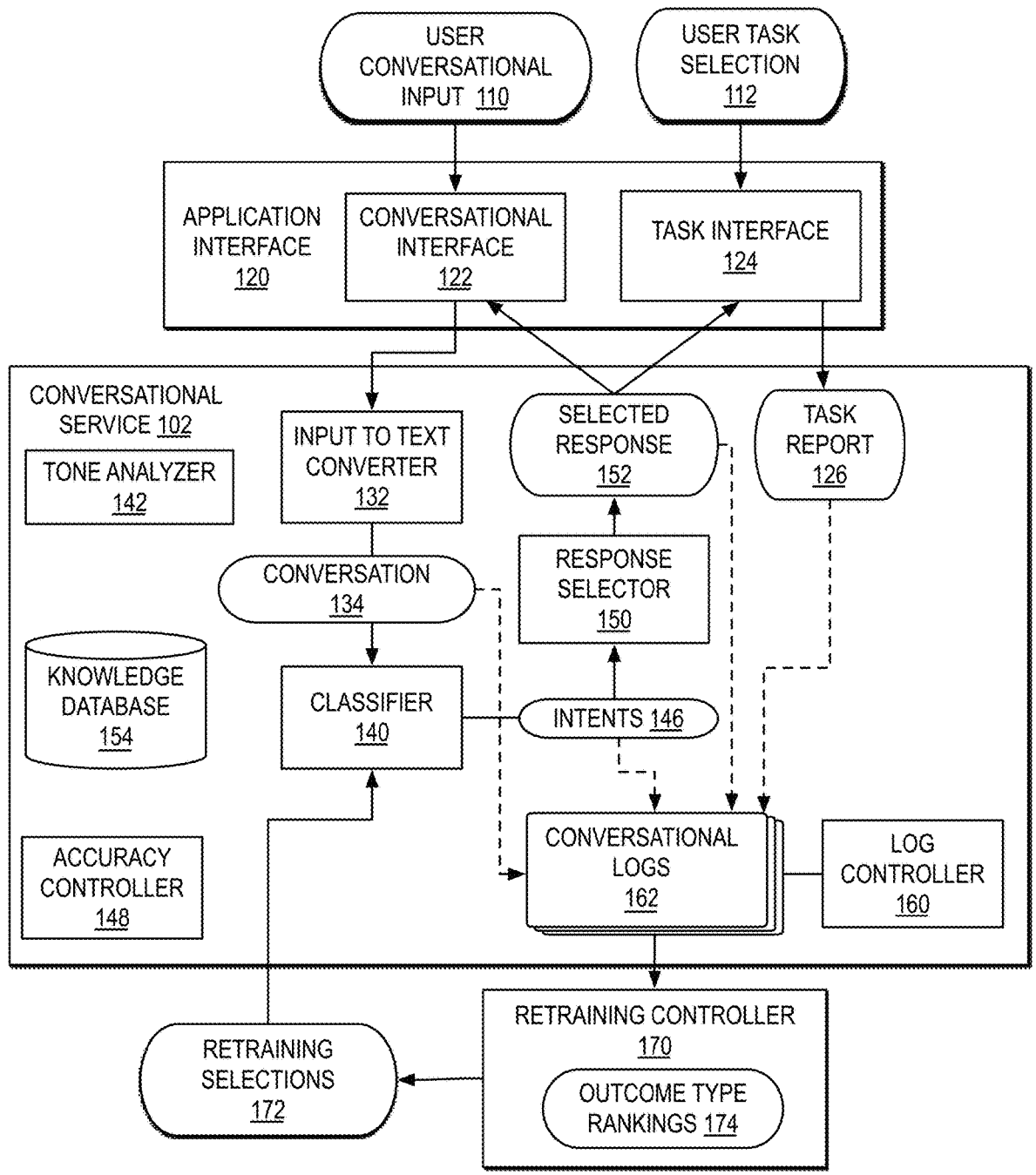
FIG. 1 is a block diagram illustrating one example of a conversational system implementing a retraining controller for evaluating recommendations for retraining of responses provided by a conversational service.

FIG. 1 illustrates a block diagram of one example of a conversational system implementing a retraining controller for evaluating recommendations for retraining of responses provided by a conversational service.

In one example, a conversational system 100 includes an application interface 120 representing one or more of a website, a web service, a cloud service, and an application. In one example, application interface 120 represents an interface for supporting one or more services, application functions, server functions, and other computer-delivered functionality on a single device or distributed across multiple devices and systems connected via a network. In additional or alternate embodiments, conversational system 100 may include additional application interfaces.

In one example, application interface 120 implements a conversational interface 122 for supporting a conversational service 102 provided to a user through conversational interface 122. In one example, conversational service 102 represents a service designed to simulate an intelligent conversation with one or more human users via conversational interface 122. In one example, conversational service 102 may represent a chatbot, with conversational interface 122 representing an interactive dialog interface for providing personalized service or information acquisition for a user. In one example, conversational service 102 supports an interactive conversation, such as an interactive dialog or chat session, within conversational interface 122. In one example, the interactive conversation supported through conversational interface 122 allows a user to receive answers to inquiries and receive information.

In one example, a user enters user conversational input 110. In one example, user conversational input 110 includes one or more types of input including, but not limited to, voice input, text input, and gesture input. In one example, conversational input 122 manages output of a selected response 152 from conversational service 102 to the user. In one example, selected response 152 includes one or more types of output including, but not limited to, audio output, video output, text output, and graphical output. In one example, conversational interface 122 may represent a chat type of interface in which a time-stamped and time-ordered log of user conversational inputs and system responses are output in a log accessible to the user. In additional or alternate embodiments, application interface 120 may implement multiple types of conversational interfaces.

In the example in FIG. 1, in addition to supporting conversational service 102, application interface 120 supports a task interface 124. In one example, task interface 124 supports performing one or more actions in response to input of a user task selection 112. In one example, user task selection represents one or more types of inputs, including audio or text inputs, that select a task supported by task interface 124. For example, task interface 124 may support an application form, where user task selection 112 represents the user input to select to complete and submit the application form supported within task interface 124. In another example, task interface 124 may support an order option, where user task selection 112 represent the user input to select to abandon, save for later, or complete the order option supported within task interface 124.

In one example, selected response 152 may also operate as a user task selection for selecting a task within task interface 124. For example, if user conversational input 110 states "please complete the order", then selected response 152 from conversational service 102 may direct task interface 124 to complete an order, as an alternative to the input of user task selection 112 within task interface 124 indicating a selection of a selectable option to complete an order. In addition, in an additional or alternate embodiment, task interface 124 may be supported within an application interface independent of application interface 120.

In one example, task interface 124 may send a task report 126 to conversational service 102 indicating a task performed, a task saved, and a task abandoned, whether in response to user task selection 112 or in response to selected response 152 as input to task interface 124. In addition, conversational service 102 may monitor task performance in relation to conversations supported by conversational interface 122 through additional or alternate types of inputs detected.

In the example, conversational service 102 may implement one or more components for converting user conversational input 110, as received via conversational interface 122, into a text format or other format in conversation 134 that can be analyzed and classified by a classifier 134. For example, conversational service 102 includes an input to text converter 132, such as a speech to text converter or gesture to text converter. In addition, input to text converter 132 may receive inputs reflecting information collected from an environment detectable related to, but outside of conversational interface 122, where input to text converter 132 may also convert detected environmental inputs into textual environmental metadata in conversation 134. For example, if a user is logged into application interface 120, application interface 120 may access the user's customer record, including user information such as a name and order history, which is detected by conversational interface 122 and may be inserted into textual environmental metadata in conversation 134.

In one example, input to text converter 132, in addition to converting user conversational input 110 into text, may access a tone analyzer 142 to analyze the tone of the user input. In one example, tone analyzer 142 samples segments of user conversational input 110 in text, uses text-based linguistic analysis to assess an emotion associated with a tone of language in the text, and inserts a tone indicators into segments of the text converted by input to text converter 132 in conversation 134. In one example, if user conversational input 110 includes user speech, tone analyzer 142 may also sample segments of user conversational input 110 in speech, uses additional speech-based linguistic analysis to assess an emotion associated with a tone, and inserts a tone indicators into segments of the text converted by input to text converter 132 in conversation 134. In one example, examples of tones assessed by tone analyzer 142 may include, but are not limited to, anger, disgust, fear, joy, sadness, analytical, confident, and tentative.

In assessing tone, tone analyzer 142 may also assess a level of each tone, indicative of a level of emotion. In one example, tone analyzer 142 assesses, from text-based and speech-based linguistic analysis of text and speech a level of user experience of each tone, indicating a level of emotion, and may include a level or a graph showing levels, in conversation 134 with tone identifiers. For example, in analyzing user conversational input 110, tone analyzer 142 may initially assess a tone of confident at a high level, however, over time, the level of the confident tone may decrease and a level identified with a tone of anger may increase. In one example, a level of each tone may be recorded to reflect one or more unit bases, such as, but not limited to, a scale of 0 to 10 and a percentage.

In one example, to manage natural language processing of conversation 134 and determination of one or more preprogrammed responses to return in response, conversational system 102 implements classifier 134 for analyzing conversation 134 and classifying conversation 134 into intents 146 of the user. An intent may represent the intent behind text and may include a corresponding classification and confidence score that the classification is correctly predicted. In one example, an intent indicates a purpose or goal expressed in a user's input, such as answering a question or processing a bill payment. In one example, a response selector 170 of conversational service 102 is trained with one or more responses available for responding to intents 146. In the example, response selector 170 collects and formats the one or more responses available for responding to the one or more intents and returns a selected response 152 to conversational interface 122, for output to a user. For example, once classifier 134 classifying user input into one or more intents, response selector 170 may choose a dialog flow for responding to the user input In one example, classifier 140 and response selector 170 of conversational service 102 may perform dialogue knowledge representation and pattern matching techniques. In one example, classifier 134 is trained using a corpus of example dialog patterns that identifies text dialog and an intent with the text dialog, to build a knowledge database 154. In one example, knowledge database 154 may be trained for a selection of intents and with multiple text dialog samples for each separate intent.

Once classifier 134 is trained, classifier 134 may handle dialog queries. In the example, classifier 134 handles queries and other text received in conversation 134 by segmenting the text and applying each segment to a trained model that applies knowledge database 154 to determine a name of a class for which the classifier has the highest confidence for each segment. In identifying the class for each segment of text, classifier 140 effectively determines the intent of the user for each segment of text, output as intents 146. In one example, classifier 140 may apply one or more types of pattern matching algorithms for predicting an intent and selecting a response. Response selector 170 accesses one or more preprogrammed responses from knowledge database 154 for each type of intent in intents 146.

In the example, a log controller 160 manages logging of conversation 134, selected response 152, and a task report 126, if available, into conversational logs 162. In one example, log controller 160 may timestamp, or ensure a timestamping, of each conversation 134, selected response 152, and task report 126 recorded, to create a time based log for each recorded item. In one example, conversational logs 162 are collected by a single conversational service or shared across multiple conversational services. In additional or alternate examples, conversational system 100 may implement an application interface that includes only a conversational interface and a separate application interface that includes only a task interface, but conversational service 102 may monitor the user inputs to each of the interfaces as related.

In one example, conversational service 102 may include an accuracy controller 148 for monitoring the percentage of confidence returned by classifier 140 for each intent of intents 146 and evaluating the accuracy of classifier 140 based on the percentages of confidence reached when predicting intents, to determine text and classes that require additional training in classifier 140 to increase accuracy in intent prediction. In one example, accuracy controller 148, in response to detecting multiple intents, each with a percentage of confidence below a threshold, identified for a particular customer input phrase, may prompt a programmer who manages training of classifier 140 to indicate the most relevant intent from among the multiple intents predicted by classifier 140, to select another intent not predicted by classifier 140, or to mark the customer input phrase as irrelevant. Based on the programmer input, classifier 140 retrains knowledge database 154 to more accurately classify the customer input phrase by the programmer selected intent. In the example, evaluating whether classifier 140 accurately classifies an intent for a segment of text enables accuracy controller 148 to retrain intent classifications to improve the accuracy of a response selected by conversational service 102 based on the user input. While evaluating the classification accuracy of conversational service 102 may provide information required to improve the performance of the classifier to evaluate a higher percentage of confidence, accuracy controller 148 may not identify conversation gaps and the responses selected for intents that most significantly impact user experience in a negative way.

According to an advantage of the invention, a retraining controller 170 accesses conversational logs 162 and assesses conversation gaps and responses that most significantly impact user experience in a negative way according to outcomes in conversational logs 162 that are classified as negative outcomes in outcome type rankings 174. In addition, according to an advantage of the invention, retraining controller 170 evaluates recommendations for retraining responses provided by conversational service 102 to overcome conversation gaps that most significantly impact user experience in a negative way, to promote a positive outcome in outcome type ranks 174, and outputs the recommendations for retraining responses to yield a different outcome as retraining selections 172. In the example, given the large volume of information from multiple conversations with many different users over time as logged in conversational logs 162, retraining controller 170 is optimized to efficiently identify the conversation gaps and responses that most significantly impact user experience according to outcomes from among conversational logs 162, to facilitate focused retraining for the identified conversation gaps. In one example, the conversation gaps and responses that most significantly have a negative impact on user experience may be identified in outcome type rankings 174 from outcomes recorded in association with conversation responses that prevent a user from completing a task or dissuade a user from completing a task, which are critical to target and retrain within conversational service 102. In one example, responses that have a positive impact on user experience may also be identified in outcome type rankings 174 from outcomes recorded in association with conversation responses that lead to a user selected to complete a task.

In particular, in the example, if conversations logged in conversational logs 162 include tone identifiers and levels, retraining controller 170, in assessing conversation gaps and responses that most significantly impact user experience in a negative way, also assesses transitions between tone identifier types and tone levels, to identify transitions that indicate outcomes in outcome type rankings 174 that are most likely indicative of a negative user experience, coupled with identifying from task reports in conversational logs 162, indicating whether a user failed to complete a task. In one example, if conversations logged in conversational logs 162 do not already include tone identifier and level assessments, retraining controller 170 may first access tone analyzer 142 to perform tone identification and level assessments for conversations logged in conversational logs 162. In one example, outcome type rankings 174 may indicate that a transition in a tone identifier from a tone identifier that is positive to a tone identifier that is negative is a negative type of outcome and a transition from a tone level from negative to positive is a positive type of outcome.

In one example, classifier 140 receives retraining selections 172 of one or more responses that most significantly impact user experience in a negative way and retrains the content of one or more responses paired with an intent in knowledge database 154. In the example, according to an advantage of the invention, time taken for retraining classifier 140, which may require computing overhead and a programmer overhead, is focused on retraining based on user experience. In contrast, accuracy controller 148 may focus retraining based on the probability percentage generated by classifier 140, for retraining an intent associated with a customer input, rather than based on information collected about the user experience receiving a response associated with an intent.

Figure 2:
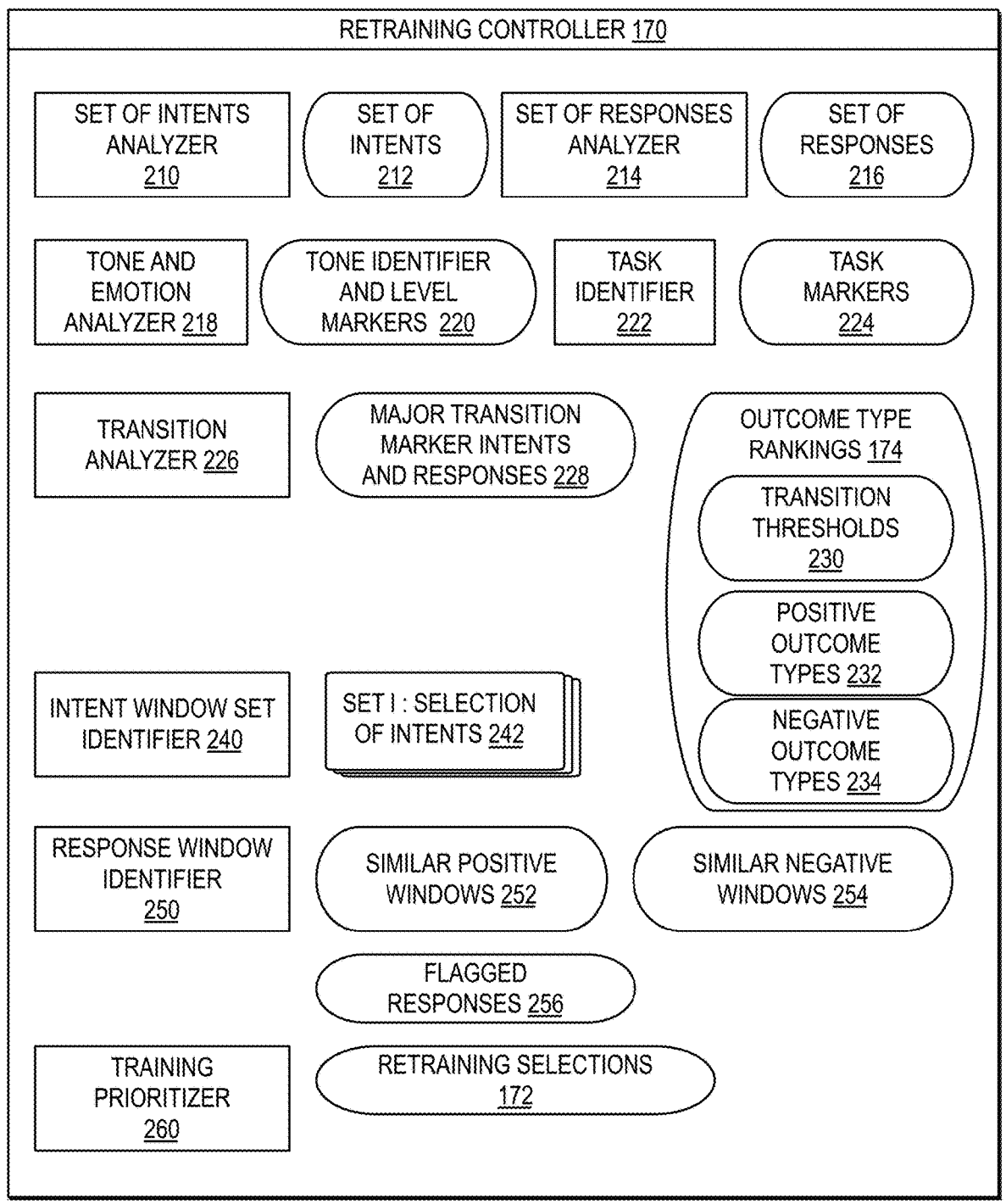
FIG. 2 is a block diagram illustrating one example of a retraining controller for providing recommendations for retraining responses to a conversational service.

FIG. 2 illustrates a block diagram of one example of a retraining controller for providing recommendations for retraining responses to a conversational service.

In one example, retraining controller 170 includes a set of intents analyzer 210. In one example, set of intents analyzer 210 defines or identifies a set of intents 212 for conversational service 102. In one example, if conversational service 102 is a new service, set of intents analyzer 210 uses one or more intent selection means, such as a k-means, to cluster utterances from conversation logs 162 or chat logs from other systems into buckets and determine set of intents 212 from the buckets. In another example, if conversational service 102 is an existing service, set of intents analyzer 210 accesses the existing intents trained for classifier 140 in knowledge database 154 as set of intents 212. During retaining of classifier 140, training updates may include detecting new utterances within conversational logs 162 that are not currently in knowledge database 154 and either selecting to match the new utterances with an existing intent in knowledge database 154 or creating a new intent and matching the new intent with an existing response dialog or creating a new response dialog, in knowledge database 154, wherein intent analyzer 210 detects new intents added to knowledge database 154 during retraining and add the new intents to the existing set of intents 212.

In one example, retraining controller 170 includes a set of responses analyzer 214. In one example, set of responses analyzer 214 defines or identifies a set of responses 216 for conversational service 102. In one example, if conversational service 102 is a new service, set of responses analyzer 214 uses one or more response selection means, such as k-means, to identify clusters of responses from conversation logs 162 or chat logs from other systems for each identified intent and determine the set of responses 216 from the buckets. In another example, if conversational service 102 is an existing service, set of responses analyzer 214 accesses the existing responses trained for response selector 170 as set of responses 216. Intent analyzer 210 also detect new responses added to knowledge database 154 during retraining and add the new responses to the existing set of responses 216.

In one example, the k-means clustering for identifying intents or responses may represent a method of vector quantization, which aims to partition "n" observations into "k" clusters in which each observation belongs to the cluster with the nearest mean, serving as a prototype of the cluster. In additional or alternate examples, retraining controller 170 may apply variations of k-means clustering or other statistical machine learning algorithms to identify clusters of utterances into groups or buckets and identify intents and responses from the clusters.

In one example, retraining controller 170 includes a tone analyzer 218 for analyzing conversational logs 162 and identifying one or more tone identifier and level markers 220 within segmented conversations in conversational logs 162. In one example, conversational logs 162 may include tone identifiers and levels for segmented conversations as identified by tone analyzer 142. In one example, a level of each tone may be recorded to reflect one or more unit bases, such as, but not limited to, a scale of 0 to 10 and a percentage.

In another example, tone analyzer 218, may analyze the tone of user input recorded in conversational logs 162, applying user or system designated boundaries to identify segments. In one example, tone analyzer 218 samples segments of user input in conversational logs 162, uses text-based linguistic analysis to assess an emotion associated with a tone of language in the text, and identifies tone markers with a tone identifier for each segment of the text in tone identifier and level markers 220. In one example, examples of tones assessed by tone analyzer 218 may include, but are not limited to, anger, disgust, fear, joy, sadness, analytical, confident, and tentative. In addition, in assessing tone, tone analyzer 218 may also assess a level of each tone, indicative of a level of emotion. In one example, tone analyzer 218 assesses, from text-based linguistic analysis of the segments of user input in conversational logs 162, a level of user experience of each tone, indicating a level of emotion and records the level in tone identifier and level markers 220. For example, in analyzing a segment of conversational logs 162, tone analyzer 218 may initially assess a tone of confident at a high level, however, over time, the level of the confident tone may decrease and a level identified with a tone of anger may increase.

In one example, retraining controller 170 includes a task identifier 222. In one example, task identifier 222 analyzes conversational logs 162 to identify one or more tasks associated with each of one or more tone identifier and level markers 220, in task markers 224.

In one example, retraining controller 170 includes a transition analyzer 226. In one example, transition analyzer 226 accesses transition thresholds 230 of outcome type rankings 174. In one example, transition thresholds 230 indicate types of transitions in tone identifiers, percentages of transition in tone levels for particular identifiers, and types of tasks that each identify a major transition that is indicator that the user experience has been impacted in a negative way. In one example, transition analyzer 226 analyzes tone identifier and level markers 220 to identify a selection of markers with changes in tone identifier from a tone identifier classified as a positive tone identifier, such as joy, to a tone identifier classified as a negative tone identifier, such as anger, where the type of transition in type of tone identifier is specified as a major transition in transition threshold 230. In addition, transition analyzer 226 analyzes tone identifier and level markers 220 and task markers 224 to identify a selection of markers with percentage changes in tone level for a particular type of tone and for a particular type of task specified as a major transition in transition threshold 230. In another example, transition analyzer 226 analyzes task markers 224 to identify a selection of markers identified in transition threshold 230 as indicating a major transition, such as markers identifying that a user selected to close an order without completing the order or markers identifying that a user let a particular amount of time pass without selecting to complete an order.

In one example, in analyzing markers for transitions in tone identifiers, tone level, or type of task, transition analyzer 226 may identify a downward transition indicating the user experience is impacted in a negative way based on negative outcome types 234 of outcome type rankings 174, from tone identifier changes or tone level changes that indicate from intents and responses that the conversation degraded or task markers indicating the user abandoned one or more tasks, however, not all downward transitions may be defined in transition threshold 230 as a major transition. In one example, in analyzing markers for transitions in tone identifiers, tone level, or type of task, transition analyzer 226 may also identify an upward transition indicating a user experience has recovered or been reset based on positive outcome types 232 in outcome type rankings 174 from tone identifier changes, tone level changes, and types of task that indicate from intents and responses that the conversation improved or task markers indicating the user completed one or more tasks.

In one example, for the markers identified from tone identifier and level markers 220 and task marker 224, transition analyzer 226 records major transition marker intents and responses 228 of the intents and responses in a window prior to each of the identified markers. In one example, transition threshold 230 may specify a length of time window or a rule for selectively determining a length of time window for capturing intents and responses prior to each major transition maker.

In one example, retraining controller 170 includes an intent window set identifier 240. In one example, intent window set identifier 240 identifies, from among major transitions markers intents and responses 228, a selection of intents that initiates each intent/response window in major transitions markers intents and responses 228, as selection of intents 242. In one example, selection of intents 242 is also referred to as "set I" 242.

In one example, retraining controller 170 includes a response window identifier 250. In one example, response window identifier 250 focuses on conversational utterances and responses after the deviations identified by the intents indicated in set I 242.

First, in one example, for each intent in set I 242, response window identifier 250 generates similar positive windows 252 from conversational logs 162, starting with the intent from set I 242, that have upward transitions or do not have downward transitions from analysis of tone identifier and level markers 220 in view of positive outcome types 232.

Second, in one example, for each intent in set I 242, response window identifier 250 identifies similar negative windows 254 from conversational logs 162, starting with the intent from set I 242, that have responses that performed negatively according to detected downward transitions from analysis of tone identifier and level markers 220, in view of negative outcome types 234. In addition, response window identifier 250 may augment the identification of responses in similar negative window 254 by applying environmental metadata, if available. For example, a particular response may be determined as performing poorly only when a particular context variable available in environmental metadata, such as an order history, is not known or not present.

Third, in one example, for each intent in set I 242, response window identifier 250 compares intents and response pairs in similar positive windows 252 with intent and response pairs in similar negative windows 254 to determine which responses led to a positive user experience and which responses contributed to a negative user experience. In the example, based on the determination by response window identifier 250 of which responses contributed to a negative user experience, response window identifier 250 correlates a negatively performing response for that intent from similar negative windows 254 to a list of flagged responses 256. In one example, if similar negative windows 254 includes multiple responses for a same intent, response window identifier 250 selects the poorest performing response to be downgraded or removed. In one example, if similar negative windows 254 includes only a single response windows for an intent, response window identifier 250 automatically adds the response to a retraining list and may suggest at least one rewording for the response by applying one or more types of rewording rules.

In one example, retraining controller 170 includes a training prioritizer 260. In one example, retraining controller 170 collects list of flagged responses 256 for each intent in set I 242 and prioritizes the intents for retraining within classifier 140 and response selector 170 in retraining selections 172. In one example, training prioritizer 260 may determine a highest priority intent for retraining as an intent for which no positive outcome in view of positive outcome types 232, of a positive tone identifier or a task completion, was recorded or an intent for which no positive response was detected in similar positive windows 252. In another example, training prioritizer 260 may determine a remaining priority of intents for retraining based on frequency of occurrence of negative trends in flagged responses 256 or downward markers identified by transition analyzer 226 according to negative outcome types 234.

According to an advantage of the invention, retraining controller 170 accesses conversational logs 162, assesses conversation gaps and responses that most significantly impact user experience in a negative way, evaluates recommendations for retraining responses provided by conversational service 102 to overcome conversation gaps that most significantly impact user experience in a negative way, and outputs the recommendations as retraining selections 172. In the example, given the large volume of information from multiple conversations with many different users over time as logged in conversational logs 162, retraining controller 170 is optimized to efficiently identify the conversation gaps that most significantly impact user experience from among conversational logs 162 by first applying transition thresholds 230 to identify major transitions indicative of conversation gaps that most significantly impact user experience in a negative way, in major transition marker intents and response 228, then determining which intents and responses preceded the major transition markers in set I 242, to facilitate focused discovery of similar positive windows 252 and similar negative windows 254 of other user experiences logged in conversational logs 162, starting with the intents in set I 242. Through focused discovery of similar positive windows 252 and similar negative windows 254, one or more responses can be determined in flagged responses 256 for each intent, which across multiple user experiences impacted user experience in a negative way. In the example, retraining based on flagged responses 256 is prioritized so that the conversation gaps and responses that most significantly impact user experience across conversational service 102 in a negative way, are addressed first.

Figure 3:
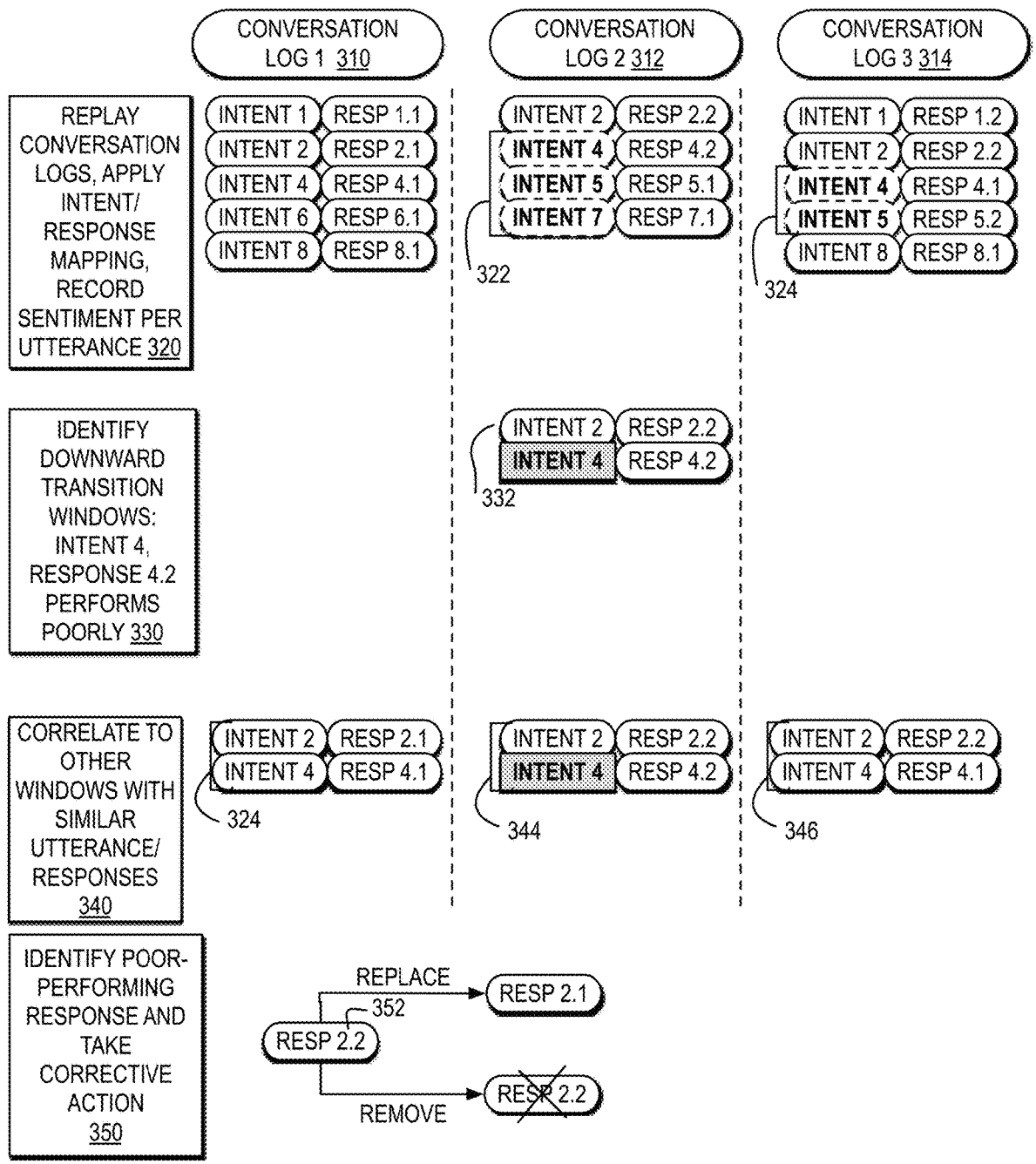
FIG. 3 is a block diagram illustrating one example of a retraining controller for evaluating recommendations for retraining responses provided by a conversational service and recommending a replacement response.

FIG. 3 illustrates a block diagram of one example of a retraining controller for evaluating recommendations for retraining responses provided by a conversational service and recommending a replacement response.

As illustrated in FIG. 3, conversational logs 162 include a conversational log 1 310, a conversational log 2 312, and a conversational log 3 314, recording three different conversations, responses, and user task actions for a same user or different users. In one example, as illustrated at reference numeral 320, retraining controller 170 replays the conversation logs and identifies and maps set of intents 212 and set of responses 216 including "intent 1" mapped to "resp 1.1", "intent 2" mapped to "resp 2.1", "intent 4" mapped to "resp 4.1", intent 6" mapped to "resp 6.1", and "intent 8" mapped to "resp 8.1" in conversation log 1 310, "intent 2" mapped to "resp 2.2", "intent 4" mapped to "resp 4.2", "intent 5" mapped to "resp 5.1", and "intent 7" mapped to "resp 7.1" in conversation log 2 312, and "intent 1" mapped to "resp 1.2", "intent 2" mapped to "resp 2.2", "intent 4" mapped to "resp 4.1", intent 5" mapped to "resp 5.2", and "intent 8" mapped to "resp 8.1" in conversation log 3 314. In addition, retraining controller 170 identifies tone identifier and level markers 220, illustrated by the intent/response markers as illustrated at reference numeral 322 marking "intent 4" mapped to "resp 4.2", marking "intent 5" mapped to "resp 5.1", and marking "intent 7" mapped to "7.1" and as illustrated at reference numeral 324 marking "intent 4" mapped to "resp 4.1" and marking "intent 5" mapped to "resp 5.2".

As illustrated in FIG. 3, at reference numeral 330, retraining controller 170 identifies that the transition in one or more of tone identifier, level, and task type from "intent 2" to "intent 4" indicates a downward transition according to transition threshold 230, wherein the window starting with "intent 2" and "resp 2.2" illustrated at reference numeral 332 is marked as a major transition. In the example, "intent 2" is illustrated as an intent in set I 242.

In the example, as illustrated at reference numeral 340, retraining controller 170 correlates, for "intent 2", other windows with similar utterances and responses. In the example, the windows illustrated at reference numeral 342 and 346 each represent examples of a similar positive windows 252, starting with "intent 2". In the example, the window illustrated at reference numeral 344 represents an example of similar negative windows 254, starting with "intent 2". In the example, retraining controller 170 identifies the response of "resp 2.2" associated with "intent 2" in the window illustrated at reference numeral 344 in flagged responses 256.

In the example, retraining controller 170 generates retraining selections 172 with a recommendation to replace "resp 2.2" from flagged responses 256. In the example, as illustrated at reference numeral 350, retraining controller 170 determines, from the similar positive windows illustrated at reference numerals 324 and 346, that a positive response for "intent 2" is "resp 2.1". In the example, as illustrated at reference numeral 352 retraining selections 172 prioritizes retraining for "resp 2.2" by removal and also recommends replacement of "resp 2.2" with the response in "resp 2.1".

Figure 4:
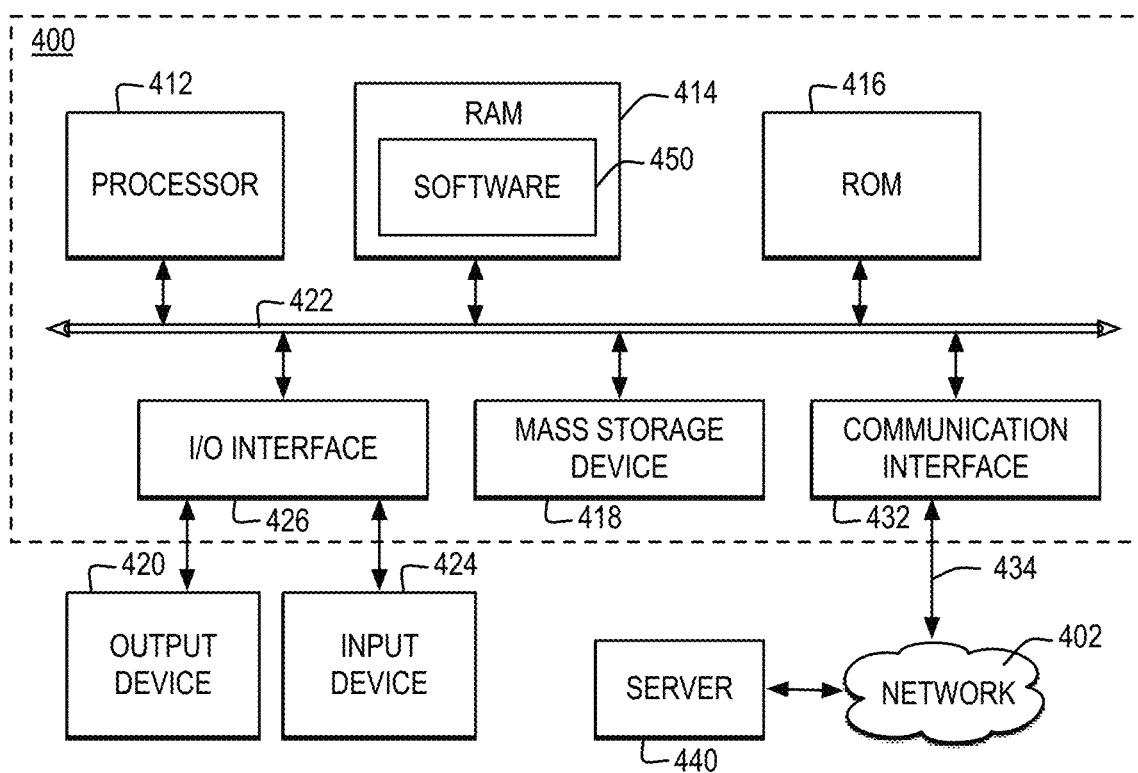
FIG. 4 is a block diagram illustrating one example of a computer system in which one embodiment of the invention may be implemented.

FIG. 4 illustrates a block diagram of one example of a computer system in which one embodiment of the invention may be implemented. The present invention may be performed in a variety of systems and combinations of systems, made up of functional components, such as the functional components described with reference to a computer system 400 and may be communicatively connected to a network, such as network 402.

Computer system 400 includes a bus 422 or other communication device for communicating information within computer system 400, and at least one hardware processing device, such as processor 412, coupled to bus 422 for processing information. Bus 422 preferably includes low-latency and higher latency paths that are connected by bridges and adapters and controlled within computer system 400 by multiple bus controllers. In one embodiment, when implemented as a server or node, computer system 400 includes multiple processors designed to improve network servicing power.

In one embodiment, processor 412 is at least one general-purpose processor that, during normal operation, processes data under the control of software 450, which includes at least one of application software, an operating system, middleware, and other code and computer executable programs accessible from a dynamic storage device such as random access memory (RAM) 414, a static storage device such as Read Only Memory (ROM) 416, a data storage device, such as mass storage device 418, or other data storage medium. In one embodiment, software 450 includes, but is not limited to, code, applications, protocols, interfaces, and processes for controlling one or more systems within a network including, but not limited to, an adapter, a switch, a server, a cluster system, and a grid environment.

In one embodiment, computer system 400 communicates with a remote computer, such as server 440, or a remote client. In one example, server 440 is connected to computer system 400 through any type of network, such as network 402, through a communication interface, such as network interface 432, or over a network link connected, for example, to network 402.

In one embodiment, multiple systems within a network environment are communicatively connected via network 402, which is the medium used to provide communications links between various devices and computer systems communicatively connected. Network 402 includes permanent connections such as wire or fiber optics cables and temporary connections made through telephone connections and wireless transmission connections, for example, and may include routers, switches, gateways and other hardware to enable a communication channel between the systems connected via network 402. Network 402 represents one or more of packet-switching based networks, telephony based networks, broadcast television networks, local area and wire area networks, public networks, and restricted networks.

Network 402 and the systems communicatively connected to computer 400 via network 402 implement one or more layers of one or more types of network protocol stacks which may include one or more of a physical layer, a link layer, a network layer, a transport layer, a presentation layer, and an application layer. For example, network 402 implements one or more of the Transmission Control Protocol/Internet Protocol (TCP/IP) protocol stack or an Open Systems Interconnection (OSI) protocol stack. In addition, for example, network 402 represents the worldwide collection of networks and gateways that use the TCP/IP suite of protocols to communicate with one another. Network 402 implements a secure HTTP protocol layer or other security protocol for securing communications between systems.

In the example, network interface 432 includes an adapter 434 for connecting computer system 400 to network 402 through a link and for communicatively connecting computer system 400 to server 440 or other computing systems via network 402. Although not depicted, network interface 432 may include additional software, such as device drivers, additional hardware and other controllers that enable communication. When implemented as a server, computer system 400 may include multiple communication interfaces accessible via multiple peripheral component interconnect (PCI) bus bridges connected to an input/output controller, for example. In this manner, computer system 400 allows connections to multiple clients via multiple separate ports and each port may also support multiple connections to multiple clients.

Figure 5:
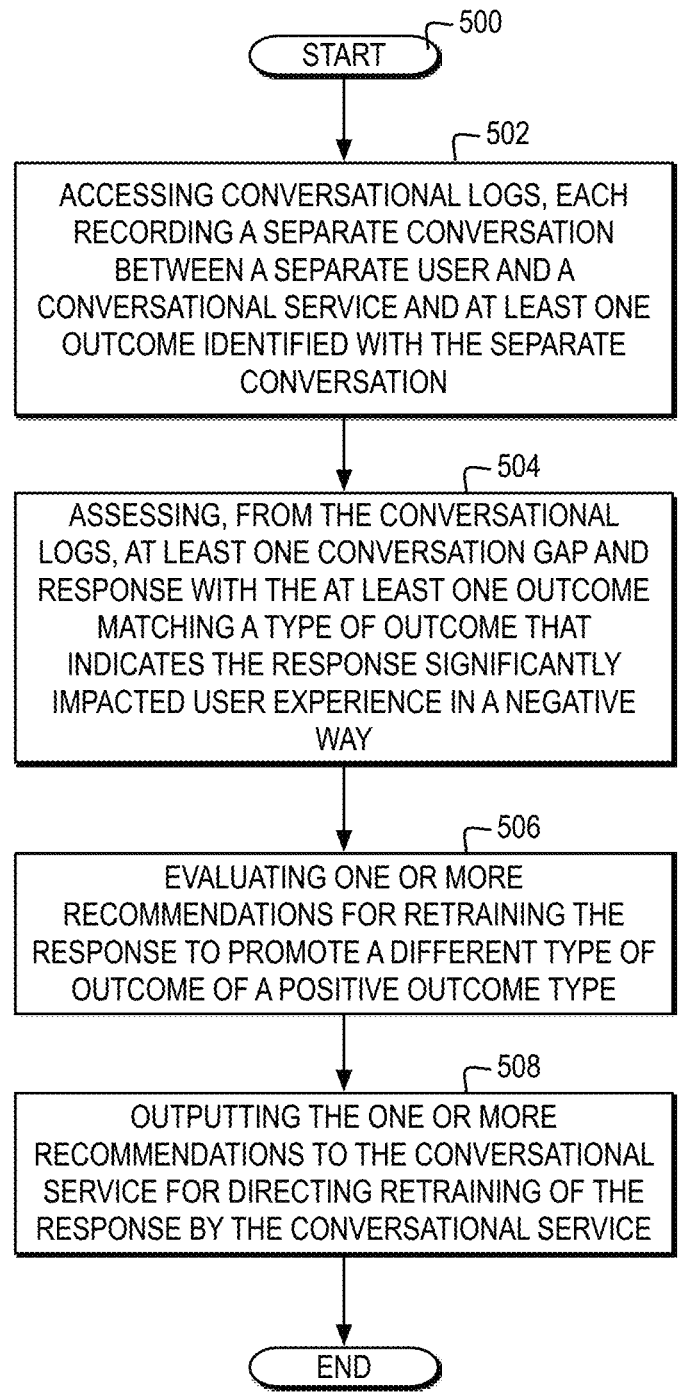
FIG. 5 is a high level logic flowchart illustrating a process and computer program for providing recommendations for retraining responses to a conversational service.
Figure 6:
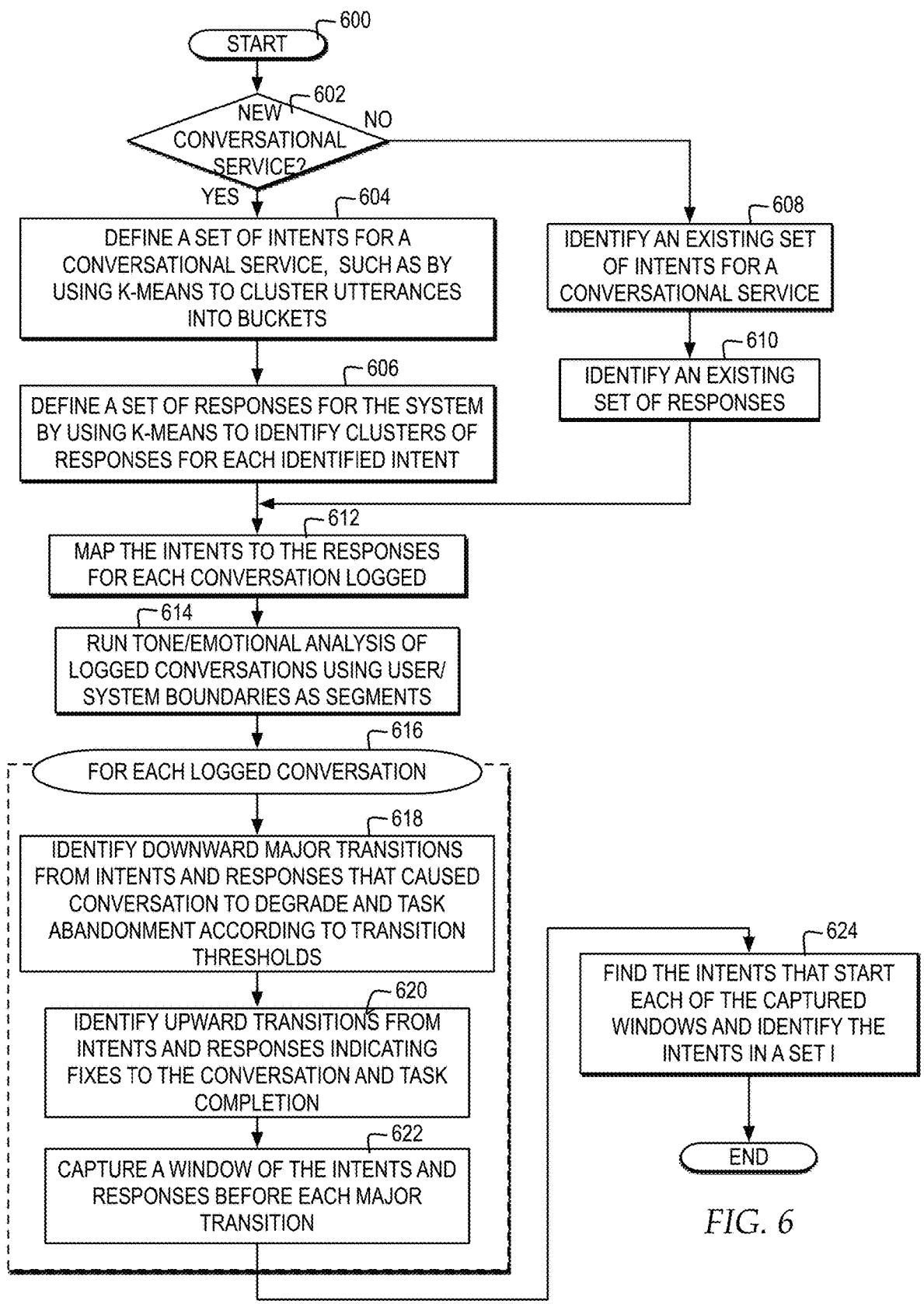
FIG. 6 is a high level logic flowchart of a process and computer program for a retraining controller identifying a set of intents in conversational logs of a conversational service that are indicators of the intent and response that occurred before a negative transition in a conversation.
Figure 7:
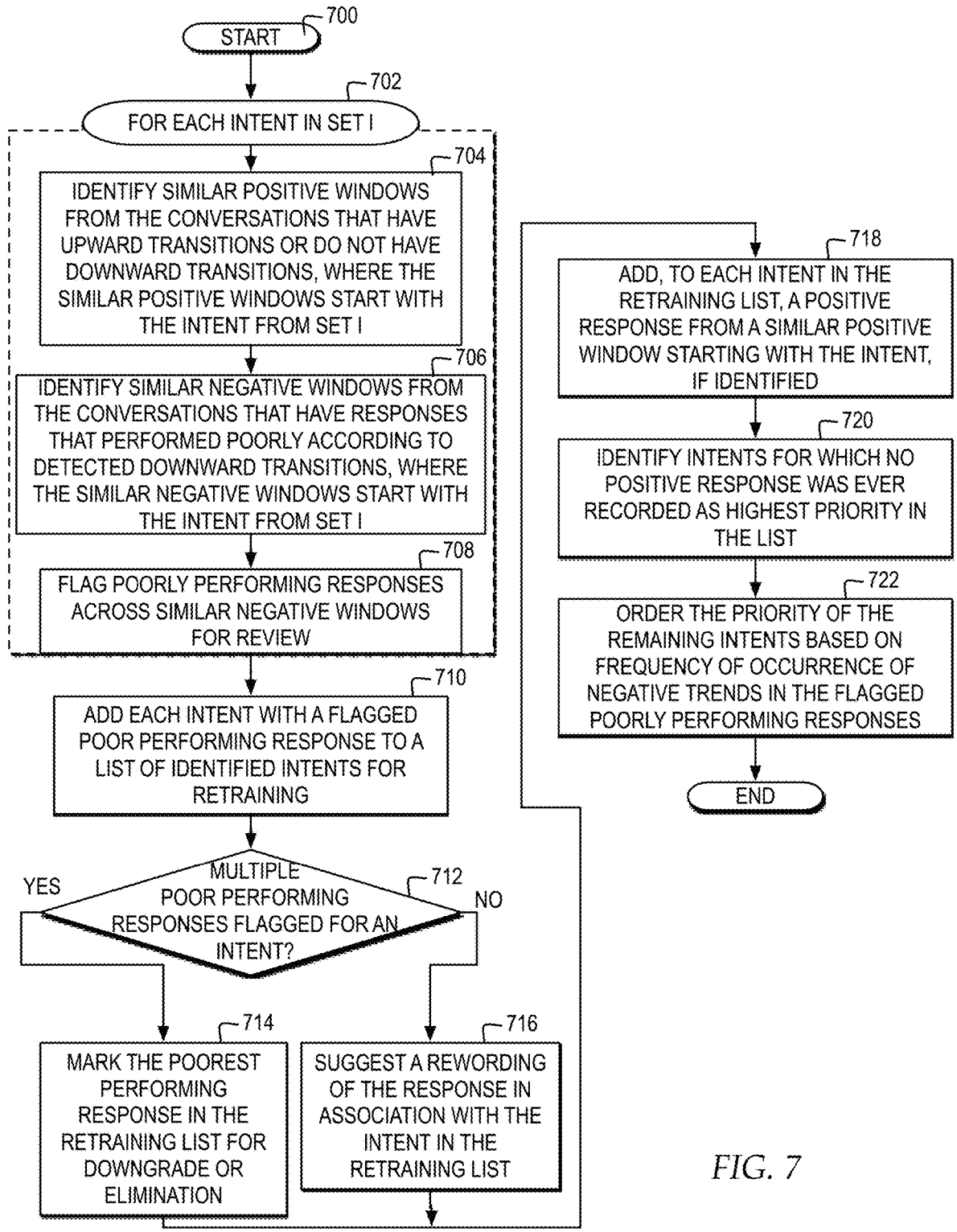
FIG. 7 is a high level logic flowchart illustrating a process and computer program for a retraining controller evaluating recommendations for retraining responses provided by a conversational service and recommending a replacement response.

In one embodiment, the operations performed by processor 412 control the operations of flowchart of FIGS. 5-7 and other operations described herein. In one embodiment, operations performed by processor 412 are requested by software 450 or other code or the steps of one embodiment of the invention might be performed by specific hardware components that contain hardwired logic for performing the steps, or by any combination of programmed computer components and custom hardware components. In one embodiment, one or more components of computer system 400, or other components, which may be integrated into one or more components of computer system 400, contain hardwired logic for performing the operations of flowcharts in FIGS. 5-7.

In one embodiment, computer system 400 includes multiple peripheral components that facilitate input and output. These peripheral components are connected to multiple controllers, adapters, and expansion slots, such as input/output (I/O) interface 426, coupled to one of the multiple levels of bus 422. For example, input device 424 includes, for example, a microphone, a video capture device, an image scanning system, a keyboard, a mouse, or other input peripheral device, communicatively enabled on bus 422 via I/O interface 426 controlling inputs. In addition, for example, output device 420 communicatively enabled on bus 422 via I/O interface 426 for controlling outputs include, for example, one or more graphical display devices, audio speakers, and tactile detectable output interfaces, but in another example also includes other output interfaces. In alternate embodiments of the present invention, additional or alternate input and output peripheral components may be added.

With respect to FIG. 4, the one or more embodiments present invention including, but are not limited to, a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. The computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of the present invention include one or more of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one example, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that in additional or alternate embodiments, the hardware depicted in FIG. 4 may vary. Furthermore, those of ordinary skill in the art will appreciate that the depicted example is not meant to imply architectural limitations with respect to the present invention.

FIG. 5 illustrates a high level logic flowchart of a process and computer program for providing recommendations for retraining responses to a conversational service.

In one example, the process and computer program starts at block 500 and thereafter proceeds to block 502. Block 502 illustrates accessing conversational logs, each recording a separate conversation between a separate user and a conversational service and at least one outcome identified with the separate conversation. Next, block 504 illustrates assessing, from the conversational logs, at least one conversation gap and response with the at least one outcome matching a type of outcome that indicates the response significantly impacted user experience in a negative way. Thereafter, block 506 illustrates evaluating one or more recommendations for retraining the response to promote a different type of outcome of a positive outcome type. Next, block 508 illustrates outputting the one or more recommendations to the conversational service for directing retraining of the response by the conversational service, and the process ends.

FIG. 6 illustrates a high level logic flowchart of a process and computer program for a retraining controller identifying a set of intents in conversational logs of a conversational service that are indicators of the intent and response that occurred before a negative transition in a conversation.

In one example, the process and computer program starts at block 600, and there after proceeds to block 602. Block 602 illustrates a determination whether a conversational service is new. At block 602, if a conversational service is new, then the process passes to block 604. Block 604 illustrates defining a set of intents for a conversational service, such as by using K-means to cluster utterances into buckets. Next, block 606 illustrates defining a set of responses for the service using K-means to identify clusters of responses for each identified intent, and the process passes the block 612.

Returning to block 602, if a conversational service is not new, then the process passes to block 608. Block 608 illustrates identifying an existing set of intents for a conversational service. Next, block 610 illustrates identifying an existing set of responses, and the process passes to blocks 612.

Block 612 illustrates mapping the intents to the responses for each conversation logged. Next, block 614 illustrates running tone/emotional analysis of logged conversations using user or system boundaries as segments, and the process passes to block 616.

Block 616 illustrates, for each logged conversation, performing blocks 618, 620, and 622. Block 618 illustrates, for each logged conversation, identifying downward transitions from intents and responses that caused conversations to degrade and task abandonment according to transition thresholds. Next, block 620 illustrates, for each logged conversation, identifying upward transitions from intents and responses indicating fixes to the conversation and task completion. Thereafter, block 622 illustrates, for each logged conversation, taking a window of the intents and responses before each major transition, and the process passes to block 624.

In response to identifying major transitions and windows preceding major transitions for each logged conversation, block 624 illustrates finding the intents that start each of the captured windows and identifying these intents in a set I, and the process ends.

FIG. 7 illustrates a high level logic flowchart of a process and computer program for a retraining controller evaluating recommendations for retraining responses provided by a conversational service and recommending a replacement response.

In one example, the process and computer program starts at block 700 and thereafter proceeds to block 702. Block 702 illustrates, for each intent in set I, performing blocks 704, 706, and 708. Block 704 illustrates identify similar positive windows from the conversation that have upward transitions or do not have downward transitions, where are the similar positive windows start with the intent from set I. Next, block 706 illustrates identifying similar negative windows from the conversations that have responses that performed poorly according to detected downward transitions, where the similar negative windows start with the intent from set I. Next, block 708 illustrates flagging poorly performing responses across similar negative windows for review, and the process passes to block 710.

Block 710 illustrates adding each intent with a flagged poor performing response to a list of identified an intense for retraining. Next, block 712 illustrates a determination whether multiple poor performing responses are flagged for an intent. At block 712, if multiple poor performing responses are flagged for an intent, then the process passes to block 714. Block 714 illustrates marking the poorest performing response in the retraining list for downgrade or elimination, and the process passes to block 718. Returning to block 712, if there are not multiple poor performing responses flagged for an intent, then the process passes to block 716. Block 716 illustrates suggesting a rewording of the response in association with the intent in the retraining list, and the process passes to block 718.

Block 718 illustrates adding, to each intent in the retraining list, a positive response from a similar positive window, if identified. Next, block 720 illustrates identifying intent or which no positive response was ever recorded as highest priority in the retraining list. Next, block 722 illustrates ordering the priority of the remaining intents based on the frequency of occurrence of negative trends in the flagged poorly performing responses, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method comprising:
    accessing, by a computer system, a plurality of conversational logs, each of the plurality of conversational logs recording a separate conversation, between a separate user of a plurality of users and a conversational service, and at least one outcome identified with the separate conversation;
    assessing, by the computer system, from the plurality of conversational logs, at least one response with the at least one outcome matching a type of outcome that indicates the at least one response impacted user experience in a negative way from among a plurality of types of outcomes by:
        identifying, by the computer system, a set of a plurality of intents implemented by the conversational service, each of the plurality of intents indicating an anticipated purpose for a user input;
        identifying, by the computer system, a set of a plurality of responses implemented by the conversational service, each of the plurality of responses matched to at least one intent from among the plurality of intents;
        mapping, by the computer system, a selection of intents of the plurality of intents to a selection of responses of the plurality of responses identified in each of the plurality of conversation logs;
        analyzing, by the computer system, a separate tone of each of a plurality of segments of the plurality of conversational logs; and
        identifying, by the computer system, at least one major transition in one or more of an identifier and a level of the separate tone from a first segment to a subsequent segment of the plurality of segments and a task abandonment, the at least one major transition in the one or more of the identifier and the level of the separate tone from the first segment to the subsequent segment with the task abandonment specified in transitions thresholds as a downward major transition, the at least one major transition indicating the at least one outcome matching the type of outcome that indicates the at least one response impacted the user experience in the negative way from among the plurality of types of outcomes;
    evaluating, by the computer system, one or more recommendations for retraining the at least one response to promote a positive type of outcome from among the plurality of types of outcomes;
    outputting, by the computer system, the one or more recommendations to the conversational service; and
    retraining, by the computer system, content of the at least one response paired with at least one of the plurality of intents in a natural language classifier of the conversational service based on the one or more recommendations, the natural language classifier for analyzing and classifying conversational inputs to automate a dialog flow for responding to the user input.

2. The method according to claim 1, further comprising:
    accessing, by the computer system, the plurality of conversational logs, each of the plurality of conversational logs record the separate conversation, the at least one outcome identified with the separate conversation, and environmental metadata comprising user information gathered from an application interface related to a conversational interface supporting the separate conversation; and assessing, by the computer system, from the plurality of conversational logs, the at least response with the at least one outcome matching a type of outcome and environmental metadata that indicates the at least one response impacted user experience in a negative way from among a plurality of types of outcomes.

3. The method according to claim 1, wherein assessing, by the computer system, from the plurality of conversational logs, at least response with the at least one outcome matching a type of outcome that indicates the at least one response impacted user experience in a negative way from among a plurality of types of outcomes further comprises:

marking, by the computer system, at least one major transition indicating a negative user experience at a particular point in each separate conversation based on the at least one outcome at the particular point reaching a transition threshold;

identifying, by the computer system, a particular response returned by the conversational service at the particular point in response to a particular intent identified by the conversational service for a text segment of user input from the separate user preceding the particular response; and identifying, by the computer system, the at least one major transition and the particular response as the at least one response.

4. The method according to claim 1, wherein identifying, by the computer system, at least one major transition in one or more of an identifier and a level of the separate tone from a first segment to a subsequent segment of the plurality of segments and a task abandonment, the at least one major transition in the one or more of the identifier and the level of the separate tone from the first segment to the subsequent segment with the task abandonment specified in transitions thresholds as a downward major transition, the at least one major transition indicating the at least one outcome matching the type of outcome that indicates the at least one response impacted the user experience in the negative way from among the plurality of types of outcomes further comprises:

identifying, by the computer system, at least one upward transition in the one or more of the identifier and the level of the separate tone from a second segment to a second subsequent segment of the plurality of segments and a task completion;

capturing, by the computer system, a separate window of one or more starting intents from among the selection of intents and each associated response prior to each at least one major transition; and identifying, by the computer system, a next selection of intents from among the one or more starting intents to analyze for retraining the at least one response associated with each of the next selection of intents to promote the positive type of outcome from among the plurality of types of outcomes.

5. The method according to claim 4, wherein identifying, by the computer system, a next selection of intents from among the one or more starting intents to analyze for retraining the at least one response associated with each of the next selection of intents to promote the positive type of outcome from among the plurality of types of outcomes further comprises:

identifying, by the computer system, at least one similar positive window starting with a particular intent from the next selection of intents and comprising the at least one upward transition;

identifying, by the computer system, at least one similar negative window starting with the particular intent from the next selection of intents and comprising at least one negative transition;

flagging, by the computer system, at least one first response in the at least one similar negative window for retraining by replacement; and selecting, by the computer system, at least one second response in the at least one similar positive window for use in retraining by the conversational service to replace the at least one first response.

6. The method according to claim 1, wherein evaluating, by the computer system, one or more recommendations for retraining the at least one response to promote a positive type of outcome from among the plurality of types of outcomes further comprises:

detecting, by the computer system, the at least one response comprising the plurality of responses;

responsive to detecting a selection of at least two responses of the plurality of response associated with a first intent from among the plurality of intents, marking, by the computer system, a poorest performing response in the at least two responses for at least one of downgrade and elimination by the conversational service; and responsive to detecting a single response of the plurality of responses associated with a second intent from among the plurality of intents, automatically suggesting, by the computer system, a rewording of the single response by the conversational service.

7. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to access a plurality of conversational logs, each of the plurality of conversational logs recording a separate conversation, between a separate user of a plurality of users and a conversational service, and at least one outcome identified with the separate conversation;

program instructions to assess, from the plurality of conversational logs, at least one response with the at least one outcome matching a type of outcome that indicates the at least one response impacted user experience in a negative way from among a plurality of types of outcomes by:

program instructions to identify a set of a plurality of intents implemented by the conversational service, each of the plurality of intents indicating an anticipated purpose for a user input;

program instructions to identify a set of a plurality of responses implemented by the conversational service, each of the plurality of responses matched to at least one intent from among the plurality of intents;

program instructions to map a selection of intents of the plurality of intents to a selection of responses of the plurality of responses identified in each of the plurality of conversation logs;

program instructions to analyze a separate tone of each of a plurality of segments of the plurality of conversational logs; and program instructions to identify at least one major transition in one or more of an identifier and a level of the separate tone from a first segment to a subsequent segment of the plurality of segments and a task abandonment, the at least one major transition in the one or more of the identifier and the level of the separate tone from the first segment to the subsequent segment with the task abandonment specified in transitions thresholds as a downward major transition, the at least one major transition indicating the at least one outcome matching the type of outcome that indicates the at least one response impacted the user experience in the negative way from among the plurality of types of outcomes;

program instructions to evaluate one or more recommendations for retraining the at least one response to promote a positive type of outcome from among the plurality of types of outcomes;

program instructions to output the one or more recommendations to the conversational service; and program instructions to retrain content of the at least one response paired with at least one of the plurality of intents in a natural language classifier of the conversational service based on the one or more recommendations, the natural language classifier for analyzing and classifying conversational inputs to automate a dialog flow for responding to the user input.

8. The computer system according to claim 7, the program instructions further comprising:

program instructions to access the plurality of conversational logs, each of the plurality of conversational logs record the separate conversation, the at least one outcome identified with the separate conversation, and environmental metadata comprising user information gathered from an application interface related to a conversational interface supporting the separate conversation; and program instructions to assess, from the plurality of conversational logs, the at least one response with the at least one outcome matching a type of outcome and environmental metadata that indicates the at least one response impacted user experience in a negative way from among a plurality of types of outcomes.

9. The computer system according to claim 7, wherein the program instructions to assess, from the plurality of conversational logs, at least one response with the at least one outcome matching a type of outcome that indicates the at least one response impacted user experience in a negative way from among a plurality of types of outcomes further comprise:

program instructions to mark at least one major transition indicating a negative user experience at a particular point in each separate conversation based on the at least one outcome at the particular point reaching a transition threshold;

program instructions to identify a particular response returned by the conversational service at the particular point in response to a particular intent identified by the conversational service for a text segment of user input from the separate user preceding the particular response; and program instructions to identify the at least one major transition and the particular response as the at least one response.

10. The computer system according to claim 7, wherein the program instructions to identify at least one major transition in one or more of an identifier and a level of the separate tone from a first segment to a subsequent segment of the plurality of segments and a task abandonment, the at least one major transition in the one or more of the identifier and the level of the separate tone from the first segment to the subsequent segment with the task abandonment specified in transitions thresholds as a downward major transition, the at least one major transition indicating the at least one outcome matching the type of outcome that indicates the at least one response impacted the user experience in the negative way from among the plurality of types of outcomes further comprise:

program instructions to identify at least one upward transition in the one or more of the identifier and the level of the separate tone from a second segment to a second subsequent segment of the plurality of segments and a task completion;

program instructions to capture a separate window of one or more starting intents from among the selection of intents and each associated response prior to each at least one major transition; and program instructions to identify a next selection of intents from among the one or more starting intents to analyze for retraining the at least one response associated with each of the next selection of intents to promote the positive type of outcome from among the plurality of types of outcomes.

11. The computer system according to claim 10, wherein the program instructions to identify a next selection of intents from among the one or more starting intents to analyze for retraining the at least one response associated with each of the next selection of intents to promote the positive type of outcome from among the plurality of types of outcomes further comprise:

program instructions to identify at least one similar positive window starting with a particular intent from the next selection of intents and comprising the at least one upward transition;

program instructions to identify at least one similar negative window starting with the particular intent from the next selection of intents and comprising at least one negative transition;

program instructions to flag at least one first response in the at least one similar negative window for retraining by replacement; and program instructions to select at least one second response in the at least one similar positive window for use in retraining by the conversational service to replace the at least one first response.

12. The computer system according to claim 7, wherein the program instructions to evaluate one or more recommendations for retraining the at least one response to promote a positive type of outcome from among the plurality of types of outcomes further comprise:

program instructions to detect the at least one response comprising the plurality of responses;

program instructions to, responsive to detecting a selection of at least two responses of the plurality of response associated with a first intent from among the plurality of intents, mark a poorest performing response in the at least two responses for at least one of downgrade and elimination by the conversational service; and program instructions to, responsive to detecting a single response of the plurality of responses associated with a second intent from among the plurality of intents, automatically suggest a rewording of the single response by the conversational service.

13. A computer program product comprises a computer readable storage medium having program instructions embodied therewith, wherein the computer readable storage medium is not a transitory signal per se, the program instructions executable by a computer to cause the computer to:
  access, by a computer, a plurality of conversational logs, each of the plurality of conversational logs recording a separate conversation, between a separate user of a plurality of users and a conversational service, and at least one outcome identified with the separate conversation;
  assess, by the computer, from the plurality of conversational logs, at least one response with the at least one outcome matching a type of outcome that indicates the at least one response impacted user experience in a negative way from among a plurality of types of outcomes by:
    identifying a set of a plurality of intents implemented by the conversational service, each of the plurality of intents indicating an anticipated purpose for a user input:
    identifying a set of a plurality of responses implemented by the conversational service, each of the plurality of responses matched to at least one intent from among the plurality of intents:
    mapping a selection of intents of the plurality of intents to a selection of responses of the plurality of responses identified in each of the plurality of conversation logs:
    analyzing a separate tone of each of a plurality of segments of the plurality of conversational logs: and
    identifying at least one major transition in one or more of an identifier and a level of the separate tone from a first segment to a subsequent segment of the plurality of segments and a task abandonment, the at least one major transition in the one or more of the identifier and the level of the separate tone from the first segment to the subsequent segment with the task abandonment specified in transitions thresholds as a downward major transition, the at least one major transition indicating the at least one outcome matching the type of outcome that indicates the at least one response impacted the user experience in the negative way from among the plurality of types of outcomes;
  evaluate, by the computer, one or more recommendations for retraining the at least one response to promote a positive type of outcome from among the plurality of types of outcomes;
  output, by the computer, the one or more recommendations to the conversational service for directing retraining of the at least one response by the conversational service; and
  retrain, by the computer, content of the at least one response paired with at least one of the plurality of intents in a natural language classifier of the conversational service based on the one or more recommendations, the natural language classifier for analyzing and classifying conversational inputs to automate a dialog flow for responding to the user input.

14. The computer program product according to claim 13, further comprising the program instructions executable by a computer to cause the computer to:
  access, by the computer, the plurality of conversational logs, each of the plurality of conversational logs record the separate conversation, the at least one outcome identified with the separate conversation, and environmental metadata comprising user information gathered from an application interface related to a conversational interface supporting the separate conversation; and
  assess, by the computer, from the plurality of conversational logs, the at least one response with the at least one outcome matching a type of outcome and environmental metadata that indicates the at least one response impacted user experience in a negative way from among a plurality of types of outcomes.

15. The computer program product according to claim 13, further comprising the program instructions executable by a computer to cause the computer to:
  mark, by the computer, at least one major transition indicating a negative user experience at a particular point in each separate conversation based on the at least one outcome at the particular point reaching a transition threshold;
  identify, by the computer, a particular response returned by the conversational service at the particular point in response to a particular intent identified by the conversational service for a text segment of user input from the separate user preceding the particular response; and
  identify, by the computer, the at least one major transition and the particular response as the at least one response.

16. The computer program product according to claim 13, further comprising the program instructions executable by a computer to cause the computer to:
  identify, by the computer, at least one upward transition in the one or more of the identifier and the level of the separate tone from a second segment to a second subsequent segment of the plurality of segments and a task completion;
  capture, by the computer, a separate window of one or more starting intents from among the selection of intents and each associated response prior to each at least one major transition; and
  identify, by the computer, a next selection of intents from among the one or more starting intents to analyze for retraining the at least one response associated with each of the next selection of intents to promote the positive type of outcome from among the plurality of types of outcomes.

17. The computer program product according to claim 16, further comprising the program instructions executable by a computer to cause the computer to:
  identify, by the computer, at least one similar positive window starting with a particular intent from the next selection of intents and comprising the at least one upward transition;
  identify, by the computer, at least one similar negative window starting with the particular intent from the next selection of intents and comprising at least one negative transition;
  flag, by the computer, at least one first response in the at least one similar negative window for retraining by replacement; and
  select, by the computer, at least one second response in the at least one similar positive window for use in retraining by the conversational service to replace the at least one first response.

* * * * *